United States Patent
Wang

(10) Patent No.: US 10,341,143 B2
(45) Date of Patent: Jul. 2, 2019

(54) CHANNEL ESTIMATION BY CONTINUOUS TIME-DOMAIN PARAMETER EXTRACTION

(71) Applicant: Xiao-an Wang, Allentown, PA (US)

(72) Inventor: Xiao-an Wang, Allentown, PA (US)

( * ) Notice: Subject to any disclaimer, the term of this patent is extended or adjusted under 35 U.S.C. 154(b) by 0 days.

(21) Appl. No.: 15/394,805

(22) Filed: Dec. 29, 2016

(65) Prior Publication Data

US 2018/0262368 A1    Sep. 13, 2018

Related U.S. Application Data

(62) Division of application No. 13/648,254, filed on Oct. 9, 2012, now Pat. No. 9,571,305.

(51) Int. Cl.
*H04L 25/02* (2006.01)

(52) U.S. Cl.
CPC ........ *H04L 25/0212* (2013.01); *H04L 25/022* (2013.01); *H04L 25/025* (2013.01); *H04L 25/0224* (2013.01); *H04L 25/0256* (2013.01)

(58) Field of Classification Search
None
See application file for complete search history.

(56) References Cited

U.S. PATENT DOCUMENTS

| | | | | |
|---|---|---|---|---|
| 2004/0042531 A1* | 3/2004 | Arikan | ......... | H04B 1/7115 375/148 |
| 2012/0063491 A1* | 3/2012 | Kong | ......... | H04B 1/7113 375/148 |
| 2012/0328060 A1* | 12/2012 | Yang | ......... | H04L 25/0204 375/349 |
| 2013/0201912 A1* | 8/2013 | Sheng | ......... | H04B 7/0413 370/328 |
| 2014/0036984 A1* | 2/2014 | Charbonneau | ...... | H04L 25/0258 375/233 |

* cited by examiner

*Primary Examiner* — Jutai Kao

(57) ABSTRACT

Methods and apparatus of channel estimation using time-domain parameter extraction are disclosed. The wireless channel can be modeled by a multipath model with a limited number of parameters in the continuous time domain. Extracting the time-domain parameters and then reconstructing the channel yields channel estimates that have better accuracy. Time-domain parameter extraction also has lower computational complexity than existing methods.

9 Claims, 1 Drawing Sheet

CHANNEL ESTIMATION BY CONTINUOUS TIME-DOMAIN PARAMETER EXTRACTION

CROSS-REFERENCE TO RELATED APPLICATIONS

This application is a divisional application of U.S. patent application Ser. No. 13/648,254, "Channel Estimation By Time-Domain Parameter Extraction", filed Oct. 9, 2012, which is incorporated herein by reference.

BACKGROUND

Field of Application

The following description relates generally to telecommunications systems and wireless communications systems.
Prior Art Channel estimation plays a key role in modern communications systems. When data is transmitted over a communications channel, the receiver needs the knowledge of the channel for data recovery, thus channel estimation is a critical function in the receiver. The quality of the channel estimation directly influences the receiver performance in terms of bit error rate and/or block error rate.

State-of-the-art wireless cellular networks employ highly spectrum-efficient transmissions such as high-order modulation and MIMO (multi-input multi-output). Such transmission schemes require even more accurate channel estimations in order to successfully recover data at the receiver. Typically channel estimation is derived from the correlation of a known pilot signal and the received signal. The accuracy of the correlation approach is limited by the correlation length and the signal-to-noise ratio (SNR), which can be poor when the channel changes rapidly or when the mobile user is at the cell edge. For example, in an OFDM (orthogonal frequency division multiplexing) network such as LTE (long-term evolution), the pilot signals are carried by certain subcarriers in frequency domain, and the channel at each pilot subcarrier can be estimated independently. If, however, the mobile user is at the edge of the serving cell, the interference from other neighbor cells can be much stronger than the pilot subcarriers. Consequently, the channel estimation quality can be very low.

The accuracy of the channel estimation can be improved by certain optimum approaches according to various criteria. Among them are least square (LS) and minimum mean-square error (MMSE). Those approaches, when applied to LTE systems, however, are often computationally intensive due to processing of large matrices, the dimension of which can be up to several hundreds. This is far beyond the processing power in the mobile-user devices to date and in the near future.

Accordingly, methods, apparatus, and systems that provide efficient and accurate channel estimation are highly desired.

SUMMARY

The following presents a summary of various aspects of the claimed subject matter. The summary is intended to be neither an extensive overview of all contemplated aspects nor a delineation of the scope of any or all aspects. The purpose of the summary is to present some concepts of one or more aspects in a simplified form in order to provide a basic understanding of such aspects, the more detailed descriptions of which are presented later.

The subject disclosure provides for improved channel estimation by extracting the time-domain parameters (TDP) of the channel from the channel observations. The TDPs can be considered as the time-domain representation of the channel estimation. The reconstructed channel from the extracted TDPs is more accurate than the channel observations that were used as the channel estimations in prior art.

In some aspects of the subject disclosure, a continuous time-domain multipath model is used to specify the TDPs. The TDPs in the continuous time domain include the number of multipaths, multipath delays, and complex amplitudes of multipaths. The TDPs are derived by minimizing the matching error in the time-domain or in the frequency-domain. The channel estimates are then reconstructed from the continuous time-domain model, which is more accurate than the channel observations.

In some other aspects of the subject disclosure, the TDPs are derived via recursive minimization of the matching error. Recursive minimization is more computationally efficient, and provides natural and convenient ways to determining the number of multipaths. Moreover, the TDPs from the recursive minimization can be refined. The refined TDPs can be obtained by minimizing the matching error with the TDPs from the recursive minimization as the initial guess. Alternatively, the multipath amplitudes can be refined by minimizing the matching error with the multipath delays obtained from the recursive minimization.

Accordingly several advantages are to provide means of accurate and efficient channel estimation. Still further advantages and novel features will become apparent from a study of the following description and the accompanying drawings.

DETAILED DESCRIPTION

Figure 1:
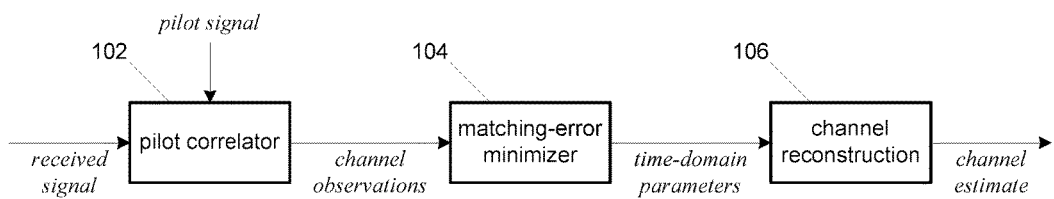
FIG. 1 illustrates an example block diagram for channel estimation by TDP extraction.

The disclosed subject matter will now be described more fully hereinafter with reference to the accompanying drawings, in which some, but not all aspects or embodiments, are shown with like numerals referring to like elements throughout the description. Specific details are described for the purpose of providing a thorough understanding of the subject innovation. It may be understood by those skilled in the art, however, that the disclosed subject matter may be practiced without these specific details. Various aspects may be embodied in many different forms and should not be construed as limited to the embodiments set forth herein. In other instances, well-known methods, procedures, and components have not been described in detail so as not to obscure the subject innovation.

In a communications system, a certain portion of the total transmitted signal is allocated to carry a pilot signal that is known to the receiver. The receiver estimates the channel by correlating the received signal with the known pilot. The results of the correlations are commonly referred to as the channel estimations in prior art. To distinguish between the channel estimations in the prior art and the improved channel estimations in various aspects of the subject disclosure, the correlation-based channel estimations will be referred to as the channel observations hereinafter. Channel estimations with improved accuracy can be obtained from the channel observations using various embodiments described herein.

The pilot can take different forms in various communications systems. For example, in a CDMA (code-division multiple access) system, the pilot is assigned to certain code channels and is transmitted along with the useful data in other code channels. In an OFDM system, the pilot is assigned to certain subcarriers at given frequencies within the signal bandwidth. The pilot and the useful data can also be multiplexed in time. Depending on the pilot type and/or the correlation method, the channel observations can be in the time domain or in the frequency domain. Note that the time-domain channel observations may be transformed to the frequency domain and vice versa.

A wireless baseband channel can be modeled in the time domain as follows:

$$h(t) = \sum_{l=0}^{L-1} \alpha_l s(t - \tau_l) \quad (1)$$

where L is the number of multipaths, $\alpha_l$ and $\tau_l$ is the complex amplitude and the propagation delay of the l-th path, respectively, and s(t) is the combined transmitter and receiver response in baseband, including the pulse shaping filter at the transmitter and match filter at the receiver. Hereinafter term "complex amplitude" will simply be referred to as "amplitude" when the context is clear. The corresponding frequency-domain channel is then $$y(\omega) = \sum_{l=0}^{L-1} \alpha_l S(\omega) e^{-j\omega \tau_l} \quad (2)$$

where $S(\omega)$ is the Fourier transform of the baseband response s(t). In the frequency domain, the channel observation at frequency $\omega_k$ is denoted as $y_k$. In the time domain, the channel observation at time $t_n$, is denoted as $h_n$.

The channel model in Eq. (1) or (2) is referred to as the continuous time-domain multipath model. The time domain parameters in the continuous time-domain multipath model are the number of multipaths L, multipath amplitudes oz, and multipath delays $\tau_l$, l=0, 1, . . . L−1.

The new generation of wireless cellular networks employs wide bandwidth and high sample rate. As a result, the number of the channel observations in both the time domain and the frequency domain can be very large. For example, in the LTE network, there are up to 400 channel observations in the frequency domain. In contrast, the number of the TDP is generally quite small due to the "sparseness" of the multipaths. While in theory there can be infinitely many multipaths, in real wireless propagation environment, the multipaths tend to appear in sparsely spaced clusters. The multipaths in each cluster have very small differences in propagation delays such that all multipaths in a cluster can be represented by a single effective multipath. Hereinafter term "effective multipath" will simply be referred to as "multipath" when the context is clear. It is the sparseness of the multipaths that makes the number of the TDPs small.

The sparseness of the multipaths in wireless channels has been validated by many years of successful operations of cellular networks. For example, the rake receiver is based on the sparseness of the multipaths, and has been a core component in 3G cellular networks.

The TDPs can be extracted from K frequency-domain channel observations via the following minimization problem:

$$\text{minimize } J_F(L, \alpha_0, \ldots, \alpha_{L-1}, \tau_0, \ldots, \tau_{L-1}) = \quad (3)$$
$$\sum_{k=0}^{K-1} \left| S(\omega_k) \sum_{l=0}^{L-1} \alpha_l e^{-j\omega_k \tau_l} - y_k \right|^p$$

where $J_F(L, \alpha_0, \ldots, \alpha_{L-1}, \tau_0, \ldots, \tau_{L-1})$ is referred to as the frequency-domain matching error, p>0 is referred to as the error norm. For example, p=2 results in the familiar LS solution, while a very large p leads to the minimum-maximum error solution. It can be appreciated that the frequency-domain matching error can also take other appropriate forms than Eq. (3). Alternatively, the TDPs can be extracted from N time-domain channel observations via the following minimization problem:

$$\text{minimize } J_T(L, \alpha_0, \ldots, \alpha_{L-1}, \tau_0, \ldots, \tau_{L-1}) = \quad (4)$$
$$\sum_{n=0}^{N-1} \left| \sum_{l=0}^{L-1} \alpha_l s(t_n - \tau_l) - h_n \right|^p$$

where $J_T(L, \alpha_0, \ldots, \alpha_{L-1}, \tau_0, \ldots, \tau_{L-1})$ is referred to as the time-domain matching error. The minimizations in Eqs. (3) and (4) are referred to as the full minimization hereinafter, to distinguish from the recursive minimization that will be described later.

The number of the multipaths L is an integer, so searching for the optimum L in the full minimization problem in Eq. (3) or (4) may require large amount of computations. One approach to reducing the computations is to have an initial estimate of L prior to minimization. L is closely related to the delay profile of the channel, i.e., the channel energy distribution in time domain. Thus L, or the range of L, may be estimated from the channel delay profile. The computations can also be reduced by making use of the fact that the channel delay profile and L change more slowly compared to the multipath amplitudes. Once an optimum L is found, the same L can be used in several subsequent minimization sessions. When L need to be updated, it can be assumed that the new optimum $L_{new}$ is not very far away from the previous optimum $L_{old}$. For example, the search candidates for $L_{new}$ can be restricted to the set $\{L_{old}-1, L_{old}, L_{old}+1\}$.

Subspace-based methods, such as multiple signal clarification (MUSIC) and estimation of signal parameters via rotational invariance techniques (ESPRIT), can also be used to provide estimates on L and $\tau_0, \ldots, \tau_{L-1}$.

Let $\hat{L}, \hat{\alpha}_0, \ldots, \hat{\alpha}_{L-1}, \hat{\tau}_0, \ldots, \hat{\tau}_{L-1}$ be a solution to the minimization problem in Eq. (3) or (4). The time-domain channel estimate is the reconstructed channel according to Eq. (1) by $\hat{L}, \hat{\alpha}_0, \ldots, \hat{\alpha}_{L-1}, \hat{\tau}_0, \ldots, \hat{\tau}_{L-1}$:

$$\hat{h}(t) = \sum_{l=0}^{L-1} \hat{\alpha}_l s(t - \hat{\tau}_l) \quad (5)$$

If the frequency-domain channel estimate is desired, the channel can be reconstructed according to Eq. (2) by $\hat{L}, \hat{\alpha}_0, \ldots, \hat{\alpha}_{\hat{L}-1}, \hat{\tau}_0, \ldots, \hat{\tau}_{\hat{L}-1}$:

$$\hat{y}(\omega) = S(\omega) \sum_{l=0}^{\hat{L}-1} \hat{\alpha}_l e^{-j\omega \hat{\tau}_l} \qquad (6)$$

The channel estimations from Eq. (5) or (6) are generally more accurate than the channel observations, i.e., the correlation-based channel estimation. The reason is that in typical wireless channels, the channel observation size, K or N, is much larger than L, which is closely related to the number of the TDPs. Therefore, when the TDPs are extracted from the channel observations according to Eq. (3) or (4), the estimation noise of the TDPs is much smaller than that of the channel observations. Accordingly the channel estimations from the reconstructed channel by the time-domain are less noisy than channel observations.

Another advantage is that the reconstructed channel in Eq. (5) or (6) provides channel estimations between the sampling points on which the channel observations are made. For example, in the LTE network, the channel observations are made on pilot subcarrier frequencies. The channel between two pilot subcarriers is obtained via interpolations in existing methods. Interpolations, however, introduce interpolation errors, especially when channel is long, i.e., the channel has a long delay spread. This, coupled with the noisy channel observations on which the interpolation is based, results in poor channel estimation quality between pilot subcarriers. Eq. (5) or (6) presents a proper model that produces channel estimates anywhere between the channel observations with better estimation quality.

FIG. 1 illustrates an example block diagram for channel estimation by TDP extraction. Pilot correlator 102 generates channel observations by correlating the received signal with the pilot signal. Note that the channel observations can be in the time domain or in the frequency domain, depending on the application. The pilot correlator can be implemented directly with correlation operations, or indirectly with means such as the discrete Fourier transform (DFT). Matching-error minimizer 104 extracts the TDPs from the channel observations by minimizing a matching error that is a function of the TDPs. Note that the matching error can be a time-domain matching error or a frequency-domain matching error. Channel reconstruction apparatus 106 reconstructs the channel from the extracted TDPs according to Eq. (5) or (6). The reconstructed channel is the desired channel estimation.

According to some aspects, the full minimization in the frequency domain in Eq. (3) can be replaced with a recursive minimization defined as follows:

$$\text{minimize } J_{F,l}(\alpha_l, \tau_l | \alpha_0, \ldots, \alpha_{l-1}, \tau_0, \ldots, \tau_{l-1}) = \qquad (7)$$

$$\sum_{k=0}^{K-1} |\alpha_l S(\omega_k) e^{-j\omega_k \tau_l} + \varepsilon_{l-1,k}|^p$$

where $J_{F,l}(\alpha_l, \tau_l | \alpha_0, \ldots, \alpha_{l-1}, \tau_0, \ldots, \tau_{l-1})$ is referred to as the frequency-domain matching error at iteration l, and $$\varepsilon_{l-1,k} = S(\omega_k) \sum_{m=0}^{l-1} \alpha_m e^{-j\omega_k \tau_m} - y_k, \; \varepsilon_{-1,k} = -y_k \qquad (8)$$

is referred to as the mismatch in the frequency domain at iteration l−1. The recursive minimization in Eq. (7) seeks the minimum over $\alpha_l$ and $\tau_l$, given $\alpha_0, \ldots, \alpha_{l-1}$ and $\tau_0, \ldots, \tau_{l-1}$ from previous iterations. This is in contrast to the minimization problem in Eq. (3), where the minimization is over $\alpha_0, \ldots, \alpha_{L-1}, \tau_0, \ldots, \tau_{L-1}$, and L. As a result, minimization in Eq. (7) requires much less computations than the full minimization in Eq. (3). When the error norm p=2, the frequency-domain matching error in Eq. (7) can be further simplified as $$J_l(\alpha_l, \tau_l | \alpha_0, \ldots, \alpha_{l-1}, \tau_0, \ldots, \tau_{l-1}) = \qquad (9)$$

$$J_{l-1}(\alpha_{l-1}, \tau_{l-1} | \alpha_0, \ldots, \alpha_{l-2}, \tau_0, \ldots, \tau_{l-2}) +$$

$$\sum_{k=0}^{K-1} (|\alpha_l|^2 |S(\omega_k)|^2 + 2\text{Re}\{\alpha_l S(\omega_k) e^{-j\omega_k \tau_l} \varepsilon_{l-1,k}^*\})$$

It follows that minimization of Eq. (9) can be written as $$\underset{\alpha_l, \tau_l}{\text{minimize}} |\alpha_l|^2 \sum_{k=0}^{K-1} |S(\omega_k)|^2 + 2 \sum_{k=0}^{K-1} \text{Re}\{\alpha_l S(\omega_k) e^{-j\omega_k \tau_l} \varepsilon_{l-1,k}^*\} \qquad (10)$$

The solution for $\tau_l$ of Eq. (10) is as follows:

$$\underset{\tau_l}{\text{argmax}} \left| \sum_{k=0}^{K-1} S(\omega_k) e^{-j\omega_k \tau_l} \varepsilon_{l-1,k}^* \right|^2 \qquad (11)$$

Many efficient algorithms exist for solving Eq. (11). Once $\tau_l$ is solved, the solution for $\alpha_l$ of Eq. (10) is given by $$\alpha_l = -\frac{\sum_{k=0}^{K-1} \varepsilon_{l-1,k} S^*(\omega_k) e^{j\omega_k \tau_l}}{\sum_{k=0}^{K-1} |S^*(\omega_k)|^2} \qquad (12)$$

The recursive minimization in Eq. (7) makes it convenient to determine the number of multipaths L. For example, the recursive minimization can be stopped if the frequency-domain matching error goes below a certain threshold. The recursive minimization can also be stopped if there is no significant difference in the frequency-domain matching errors between consecutive iterations, which may indicate that more iterations with more multipaths may not yield meaningful improvement. Then the number of iterations can be considered to be the effective number of multipaths.

The recursive minimization can also be applied to time-domain channel observations:

$$\text{minimize } J_{T,l}(\alpha_l, \tau_l | \alpha_0, \ldots, \alpha_{l-1}, \tau_0, \ldots, \tau_{l-1}) = \qquad (13)$$

-continued $$\sum_{n=0}^{N-1} |\alpha_l s(t_n - \tau_l) + \delta_{l-1,n}|^p$$

where $J_{T,l}(\alpha_l, \tau_l | \alpha_0, \ldots, \alpha_{l-1}, \tau_0, \ldots, \tau_{l-1})$ is referred to as the time-domain matching error at iteration l, and $$\delta_{l-1,n} = \sum_{m=0}^{l-1} \alpha_m s(t_n - \tau_m) - h_n, \delta_{-1,n} = -h_n \quad (14)$$

is referred to as the mismatch in the time domain at iteration l-1. Note that when the error norm p=2, Eq. (13) can be solved in the frequency domain by transforming the time-domain channel observations $h_n$ to the frequency domain channel observations $y_k$.

Figure 2:
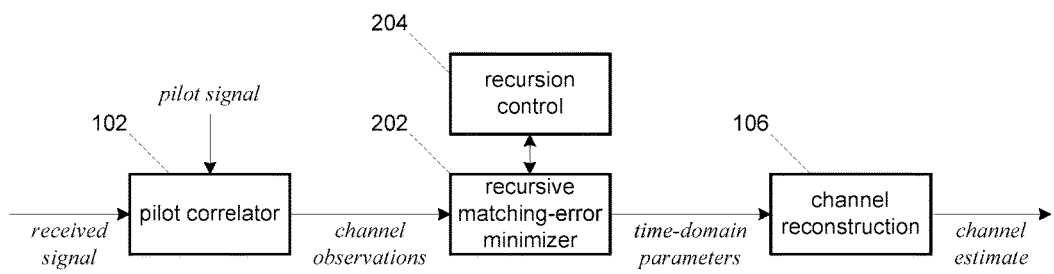
FIG. 2 illustrates an example block diagram for channel estimation by TDP extraction with recursive minimization of the matching error.

FIG. 2 illustrates an example block diagram for channel estimation by TDP extraction with recursive minimization of the matching error. Recursive matching-error minimizer 202 replaces matching-error minimizer 104 in FIG. 1. Recursion control apparatus 204 controls when to stop the recursive minimization.

The results of the recursive minimization can be further refined. For example, the TDPs from the recursive minimization can be used as an initial guess for the full minimization in Eq. (3) or (4). Many algorithms, such as Newtonian method, exist for solving the minimization in Eq. (3) or (4) with an initial guess. That the solution of the recursive minimization is refined can be seen from the fact that the matching error from Eqs. (3) and (4) is no larger, and in general, smaller than that from Eqs. (7) and (13), respectively.

Alternatively, the refinement can be made by minimizing the matching error given the solved multipath delays $\tau_0, \ldots, \tau_l$ from the recursive minimization. Assuming the frequency-domain channel observations are used, the minimization is defined as follows:

$$\text{minimize } J_F(\alpha_0, \ldots, \alpha_l | \tau_0, \ldots, \tau_l) = \quad (15)$$

$$\sum_{k=0}^{K-1} \left| S(\omega_k) \sum_{m=0}^{l} \alpha_m e^{-j\omega_k \tau_m} - y_k \right|^p$$

That is, the minimization is over the multipath amplitudes $\alpha_0, \ldots, \alpha_l$ while the multipath delays $\tau_0, \ldots, \tau_l$ are fixed during minimization. For p=2, the solution to Eq. (15) is LS and is given by $$\alpha = (E^H E + \sigma^2 I)^{-1} E^H y \quad (16)$$

where $\alpha = [\alpha_0 \alpha_1 \ldots \alpha_l]^T$, $y = [y_0 y_1 \ldots y_{K-1}]^T$ is the vector of frequency-domain channel observations, E is a K×(l+1) matrix whose (k,m)-th element is $S(\omega_k)e^{-j\omega_k \tau_m}$, $E^H$ denotes the Hermitian transpose of E, and $\sigma^2 \geq 0$ is the diagonal loading factor that can be used to maintain the numerical stability if $E^H E$ is ill-conditioned. That the solution of the recursive minimization is refined can be seen from the fact that the frequency-domain matching error from Eq. (15) is no larger, and in general, smaller than that from Eq. (7).

If the time-domain channel observations are used, the time-domain counterpart of Eq. (15) is as follows:

$$\text{minimize } J_T(\alpha_0, \ldots, \alpha_l | \tau_0, \ldots, \tau_l) = \sum_{n=0}^{N-1} \left| \sum_{m=0}^{l} \alpha_m s(t_n - \tau_m) - h_n \right|^p \quad (17)$$

For p=2, the solution to Eq. (17) is LS and is given by $$\alpha = (D^H D + \sigma^2 I)^{-1} D^H h \quad (18)$$

where $h = [h_0 h_1 \ldots h_{N-1}]^T$ is the vector of time-domain channel observations, and D is a N×(l+1) matrix whose (n,m)-th element is $s(t_n - \tau_m)$.

Figure 3:
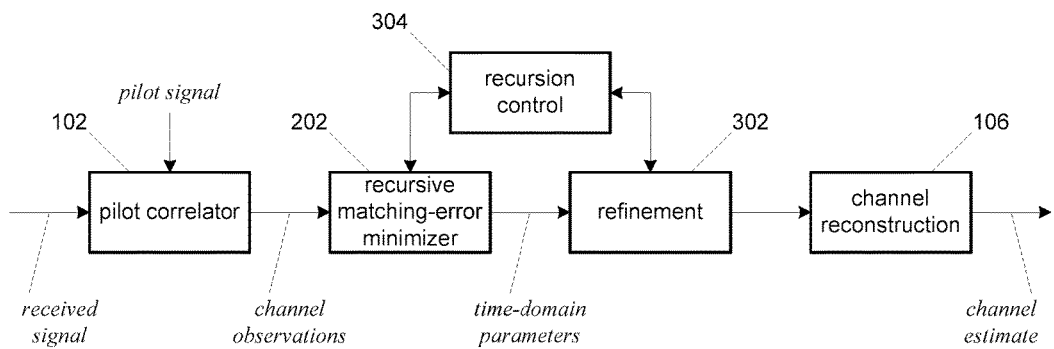
FIG. 3 illustrates an example block diagram for channel estimation by TDP extraction with recursive minimization and the TDP refinement.

FIG. 3 illustrates an example block diagram for channel estimation by TDP extraction with the recursive minimization and the TDP refinement. Refinement apparatus 302 further improves the TDP from recursive matching-error minimizer 202. Refinement apparatus 302 can use the TDPs from recursive matching-error minimizer 202 as the initial guess to solve the full minimization in Eq. (3) or (4). Alternatively, it can use the multipath delays from recursive matching-error minimizer 202 to obtain the refined multipath amplitudes that minimize the matching error as shown in Eq. (15) or (17). Recursion control 304 controls when to stop the recursive minimization. Recursion control 304 can also schedule the refinement such that the TDPs are refined either after the completion of the recursive minimization, or after each iteration during the recursive minimization.

CONCLUSION, RAMIFICATIONS, AND SCOPE

Accordingly it will be seen that channel estimation by TDP extraction significantly improves the channel estimation quality. The improved channel estimation quality translates to the receiver performance in terms of the bit-error rate, throughput, etc. The TDP extraction is also highly efficient in computations.

Various aspects of the subject disclosure are described with LTE cellular networks. It is to be understood and appreciated that the principles of the subject disclosure also apply to other wireless networks and systems, such as wireless local area network (WLAN), as well as to general communication networks.

While the foregoing disclosure describes illustrative aspects and/or embodiments, it should be noted that various changes and modifications could be made herein by those skilled in the art without departing from the scope of the described aspects and/or embodiments as defined by the appended claims. Furthermore, all or a portion of any aspect and/or embodiment can be utilized with all or a portion of any other aspect and/or embodiment, unless stated otherwise. It is, therefore, to be understood that the appended claims are intended to cover all such modifications, changes, and combinations as fall within the true spirit and the scope of the disclosed subject matter.

What is claimed is:

1. A method for channel estimation, comprising:
   (a) generating a set of channel observations from a pilot signal in a received signal,
   (b) modeling the channel, through which said received signal is received, with a continuous time-domain multipath model, having a set of time-domain parameters comprising:
      (i) number of multipaths,
      (ii) delays of said multipaths, and
      (iii) complex amplitudes of said multipaths,
   (c) extracting said set of time-domain parameters to obtain time-domain parameter estimates by minimizing a matching error between said set of channel observations and said continuous time-domain multipath model. said time-domain parameter estimates being solution to minimization of said matching error, and (d) reconstructing said channel with said time-domain parameter estimates, whereby the reconstructed channel provides channel estimates that are more accurate than said channel observations.

2. The method of claim 1, wherein said matching error is frequency-domain matching error.

3. The method of claim 1, wherein said matching error is time-domain matching error.

4. The method of claim 1, wherein minimizing said matching error comprises employing full minimization.

5. The method of claim 1, wherein minimizing said matching error comprises employing recursive minimization.

6. The method of claim 5, further comprising performing full minimization with said time-domain parameter estimates from said recursive minimization as an initial guess, whereby said time-domain parameter estimates are further refined after said full minimization.

7. The method of claim 5, wherein said recursive minimization is stopped when the difference between said matching errors of the last iteration and the previous iteration is within a predetermined range.

8. The method of claim 5, wherein said number of multipaths is the number of iterations in said recursive minimization.

9. The method of claim 5, further comprising refining said complex amplitudes of said multipaths by minimizing said matching error with said number of said multipaths and said delays of said multipaths obtained from said recursive minimization.

* * * * *